US007864342B2

(12) United States Patent
Weiss et al.

(10) Patent No.: US 7,864,342 B2
(45) Date of Patent: Jan. 4, 2011

(54) APPARATUS AND METHOD FOR MEASURING DISPLACEMENT OF A CURVED SURFACE USING DUAL LASER BEAMS

(75) Inventors: Richard M. Weiss, Tequesta, FL (US); Joseph H. Butler, Knoxville, TN (US)

(73) Assignee: The Richard M. Weiss Revocable Trust, Tequesta, FL (US)

( * ) Notice: Subject to any disclaimer, the term of this patent is extended or adjusted under 35 U.S.C. 154(b) by 283 days.

(21) Appl. No.: 12/247,667

(22) Filed: Oct. 8, 2008

(65) Prior Publication Data
US 2010/0085578 A1 Apr. 8, 2010

(51) Int. Cl.
*G01B 11/14* (2006.01)
(52) U.S. Cl. .......................... 356/614; 356/622
(58) Field of Classification Search .......... 356/600–640
See application file for complete search history.

(56) References Cited
U.S. PATENT DOCUMENTS

| 4,325,640 | A | * | 4/1982 | Dreyfus et al. | .............. 356/602 |
|---|---|---|---|---|---|
| 4,526,465 | A | | 7/1985 | Corti et al. | |
| 4,695,163 | A | * | 9/1987 | Schachar | ..................... 356/369 |
| 4,872,751 | A | * | 10/1989 | Hercher | ..................... 356/35.5 |
| 5,046,851 | A | * | 9/1991 | Morgan | ....................... 356/615 |
| 5,394,233 | A | | 2/1995 | Wang | |
| 6,008,887 | A | | 12/1999 | Klein et al. | |
| 6,183,375 | B1 | | 2/2001 | Weiss | |
| 6,572,488 | B1 | | 6/2003 | Weiss et al. | |
| 6,714,284 | B2 | * | 3/2004 | Norman et al. | ............ 356/4.01 |

(Continued)

FOREIGN PATENT DOCUMENTS

JP 58-108406 6/1983

(Continued)

OTHER PUBLICATIONS

International Search Report and Written Opinion for corresponding International Application No. PCT/US2009/059683, mail date May 20, 2010.

*Primary Examiner*—Gregory J Toatley
*Assistant Examiner*—Jarreas C Underwood
(74) *Attorney, Agent, or Firm*—Graham Curtin, PA

(57) ABSTRACT

An apparatus measures displacement of a structure having a curved surface, such as a pipe, conduit, shaft or rod. The apparatus includes a support structure having opposing first and second ends, with a first laser distance measurement device at the first end and a second laser distance measurement device at the second end. The laser distance measurement devices generate dual laser beams that illuminate the curved surface of the structure, detect laser energy reflected from the curved surface of the structure, and generate distance signals based on the detected laser energy. A measurement device on the support structure measures a spacing between the two laser beams. The support structure is pivotally attached to a stabilizing base, thereby providing for the tilting of the support structure and the laser beams. An inclinometer on the support structure measures an angle of tilt. A computer processor calculates position values indicating displacement of the curved surface based on the distance signals, the spacing between the laser beams, the radius of curvature of the curved surface, and the angle of tilt of the laser beams. Tripod-mounted and portable handheld versions of the apparatus are described.

13 Claims, 4 Drawing Sheets

U.S. PATENT DOCUMENTS

| | | |
|---|---|---|
| 6,915,695 B2 | 7/2005 | Weiss et al. |
| 6,990,865 B2 | 1/2006 | Weiss et al. |
| 6,997,056 B2 | 2/2006 | Weiss et al. |
| 7,242,481 B2 | 7/2007 | Shpantzer et al. |
| 7,302,852 B2 | 12/2007 | Chien |

FOREIGN PATENT DOCUMENTS

| | | |
|---|---|---|
| JP | 63-121705 | 5/1988 |
| JP | 02-028503 | 1/1990 |
| JP | 11-014308 | 1/1999 |

\* cited by examiner

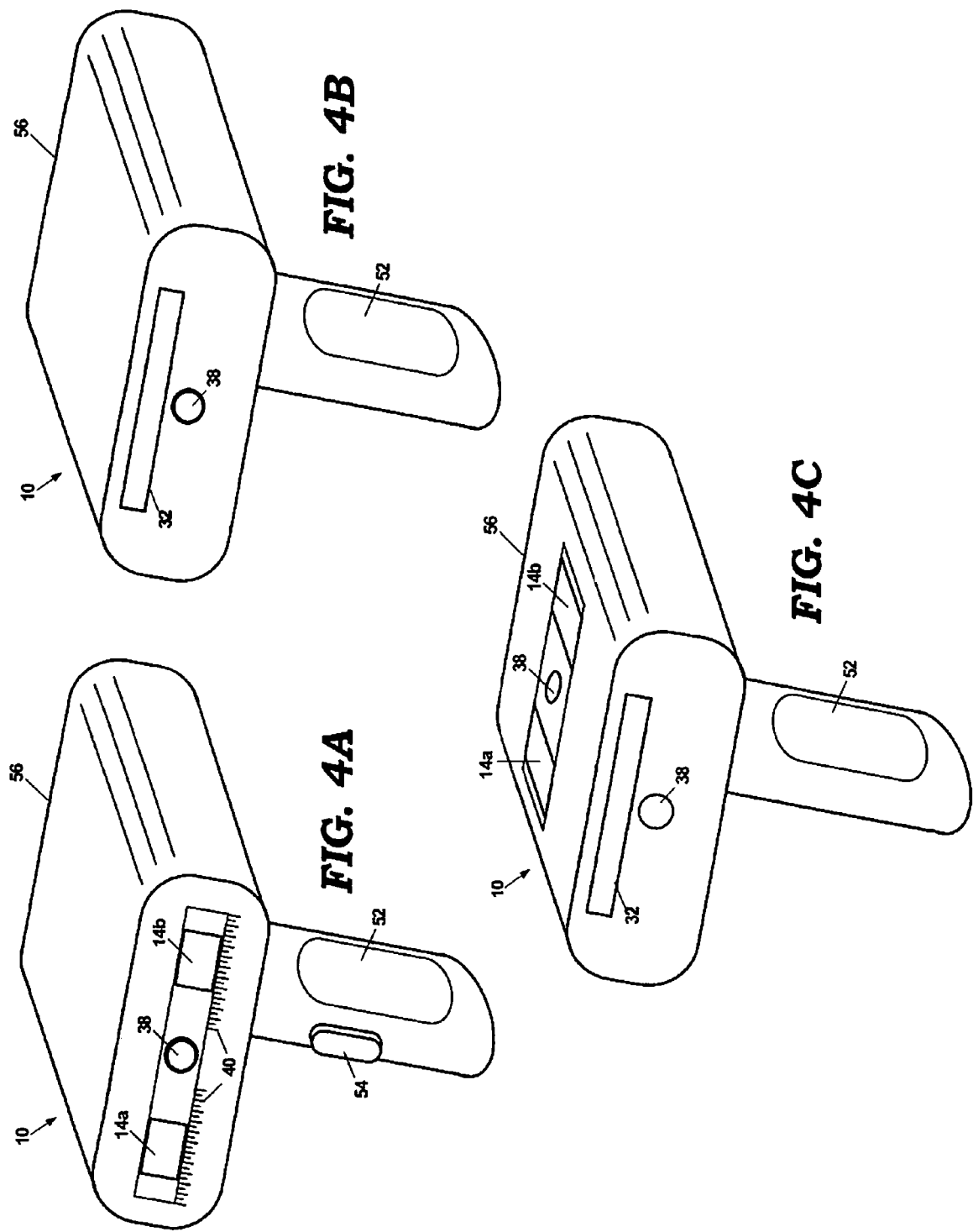

APPARATUS AND METHOD FOR MEASURING DISPLACEMENT OF A CURVED SURFACE USING DUAL LASER BEAMS

FIELD

This invention relates to the measurement of the displacement of a cylindrical surface. More particularly, this invention relates to the use of two laser distance measurement devices emitting parallel laser beams to remotely measure movement of a structure having a cylindrical outer surface, such as a pipe, conduit, rod or shaft.

BACKGROUND

Pipes used in industrial, manufacturing and power plant settings often bend, move and vibrate due to variations in the pressure or temperature of fluids moving within the pipes, and sometimes due to variations in the environment in which the pipe is disposed. Personnel responsible for operation and maintenance of piping systems in these settings need to be able to monitor movements and vibration in piping systems to ensure that such movement and vibration is within acceptable bounds. Otherwise severe damage could occur.

Although interferometer-type devices have been used to provide information about vibration frequencies in piping systems, no devices have been available for non-contact, remote monitoring of the displacement of a pipe in two dimensions. Various embodiments of the present invention fill this need.

SUMMARY

The above and other needs are met by an apparatus for measuring displacement of a structure having a curved surface. In a preferred embodiment, the apparatus includes a support structure having opposing first and second ends, with a first laser distance measurement device disposed adjacent the first end and a second laser distance measurement device disposed adjacent the second end. The first laser distance measurement device generates a first laser beam that illuminates the curved surface of the structure, detects laser energy reflected from the curved surface of the structure, and generates a first distance signal based on the detected laser energy. Likewise, the second laser distance measurement device generates a second laser beam that illuminates the curved surface of the structure, detects laser energy reflected from the curved surface of the structure, and generates a second distance signal based on the detected laser energy. A measurement device is disposed on the support structure for measuring a spacing between the first and second laser beams. The apparatus includes a stabilizing base to which the support structure is pivotally attached, thereby providing for the tilting of the support structure and the first and second laser beams. An inclinometer is disposed on the support structure for measuring an angle of tilt. A computer processor calculates position values indicating displacement of the structure based on the first and second distance signals, the spacing between the first and second laser beams, the radius of curvature of the curved surface, and the angle of tilt of the first and second laser beams.

In some preferred embodiments, the curved surface comprises a cylindrical surface, and the computer processor calculates the position values according to:

$$x = \sqrt{R^2 - \left(\frac{\sqrt{(d_2-d_1)^2 + S^2}}{2}\right)^2} \times \frac{d_2 - d_1}{\sqrt{(d_2-d_1)^2 + S^2}}$$

$$y = \sqrt{R^2 - \left(\frac{S}{2} - x\right)^2} - \sqrt{R^2 - \left(\frac{S}{2}\right)^2} + d_2 - d_{2INIT},$$

where x is an x-position of the structure having the cylindrical surface, y is a y-position of the structure having the cylindrical surface, S is the spacing between the first and second laser beams, $d_1$ is a distance indicated by the first distance signal, $d_2$ is a distance indicated by the second distance signal, $d_{2INIT}$ is an initial distance indicated by the second distance signal when the cylindrical surface is in an initial position, and R is the radius of curvature of the cylindrical surface.

In some embodiments, at least the support structure, the first and second laser distance measurement devices and the inclinometer are disposed within a portable handheld housing. The computer processor may also be integrated into the handheld housing, or it may be disposed separately from the handheld housing and receive measurement data from the laser distance measurement devices via a wiring harness or a wireless data link.

In another aspect, the invention provides a method for measuring displacement of a structure having a curved surface. In some preferred embodiments, the method includes the following steps:

(a) generating first and second laser beams that illuminate the curved surface of the structure;
(b) detecting laser energy reflected from the curved surface of the structure;
(c) generating a first distance signal based on the detected laser energy, where the first distance signal is indicative of a first distance to a first portion of the curved surface;
(d) generating a second distance signal based on the detected laser energy, where the second distance signal is indicative of a second distance to a second portion of the curved surface;
(e) determining a spacing between the first and second laser beams;
(f) calculating data values indicating a characteristic of the movement of the structure based on the first and second distance signals, the spacing between the first and second laser beams, and a radius of curvature of the curved surface; and
(g) displaying the data values on a display device to provide information regarding the movement of the structure.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein:

FIGS. 4A, 4B and 4C depict handheld configurations of an apparatus for remotely measuring displacement of a curved surface.

DETAILED DESCRIPTION

Figure 1:
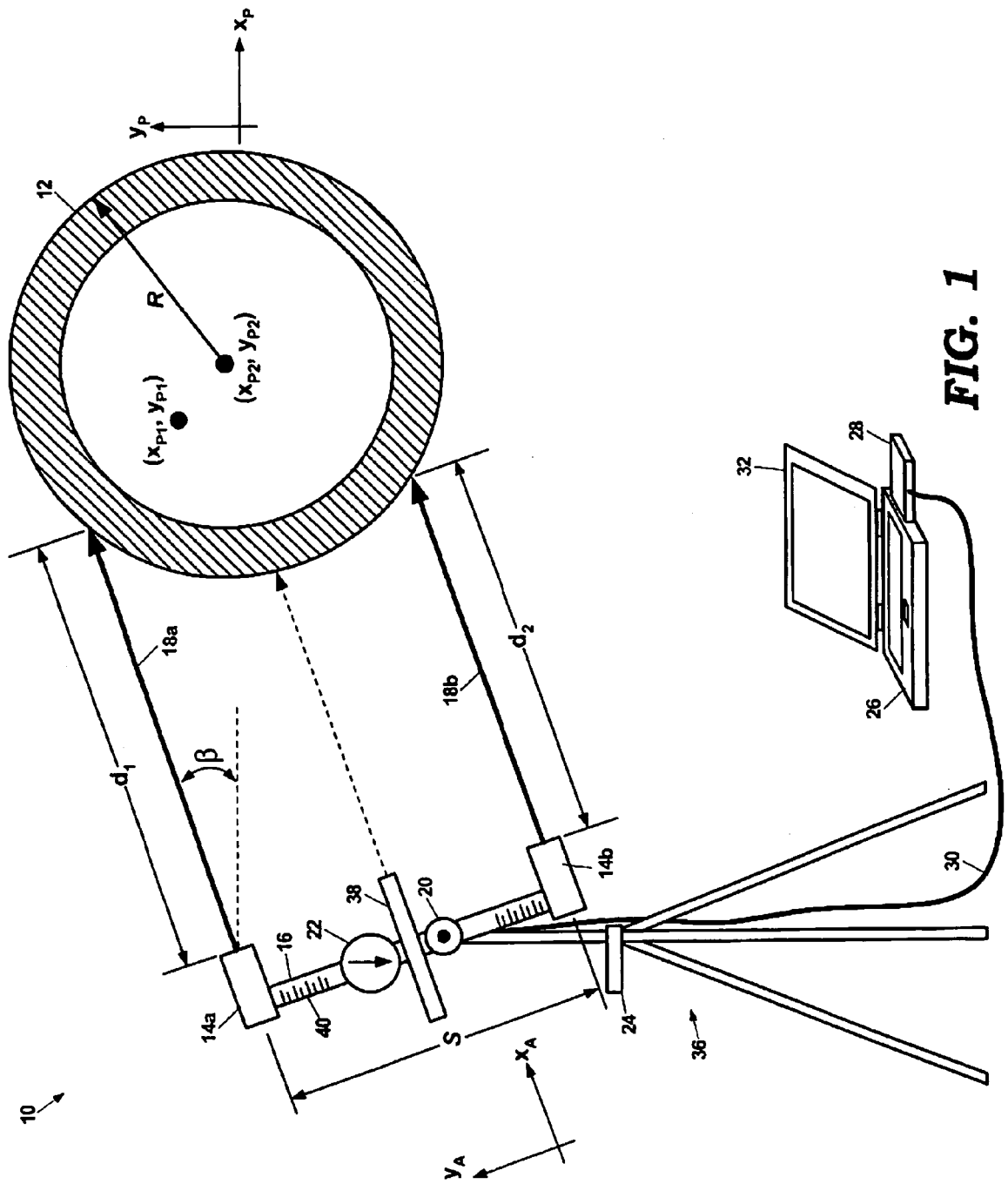
FIG. 1 depicts a physical configuration of an apparatus for remotely measuring displacement of a curved surface.

As shown in FIG. 1, an apparatus 10 for remotely measuring displacement of a curved surface, such as a cylindrical surface of a shaft or pipe 12, includes a pair of laser distance sensors 14a and 14b disposed at opposite ends of a support structure 16. The sensors 14a-14b are oriented such that the laser beams 18a and 18b emitted there from are parallel, or substantially parallel, to each other and perpendicular to the support structure 16 (step 100 in FIG. 3). Laser energy reflected from the pipe 12 is detected by the sensors 14a-14b (step 102) which generate distance signals based on the detected laser energy (step 104). These distance signals indicate the distances $d_1$ and $d_2$ between the sensors 14a-14b and two points on the pipe 12 from which the beams 18a-18b are reflected. As shown in FIG. 1, the laser beams 18a-18b are separated by a horizontal distance S.

As the axial center of the pipe 12 moves in relation to the laser distance sensors 14a-14b, such as from a first position $(x_1, y_1)$ to a second position $(x_2, y_2)$, the distances $d_1$ and $d_2$ to the surface of the pipe 12 change accordingly. Thus, the distances $d_1$ and $d_2$, the separation S, and the radius R of the pipe 12 may be used to calculate the horizontal and vertical movement of the axial center of the pipe 12. These data may also be used to calculate the frequency of vibration of the pipe 12 based on the horizontal and vertical movement.

As shown in FIG. 1, the support structure 16 is mounted on a stabilizing base, such as tripod 36 or other similar structure. Preferably, the support structure 16 is attached to the tripod 36 by a pivot mechanism 20 which allows the laser distance sensors 14a-14b to be tilted and aimed at a pipe 12 that is disposed above, at the same level or below the position of the apparatus 10. In a preferred embodiment, a bubble level 24 or other level-indicating device is provided on the tripod 36.

Figure 3:
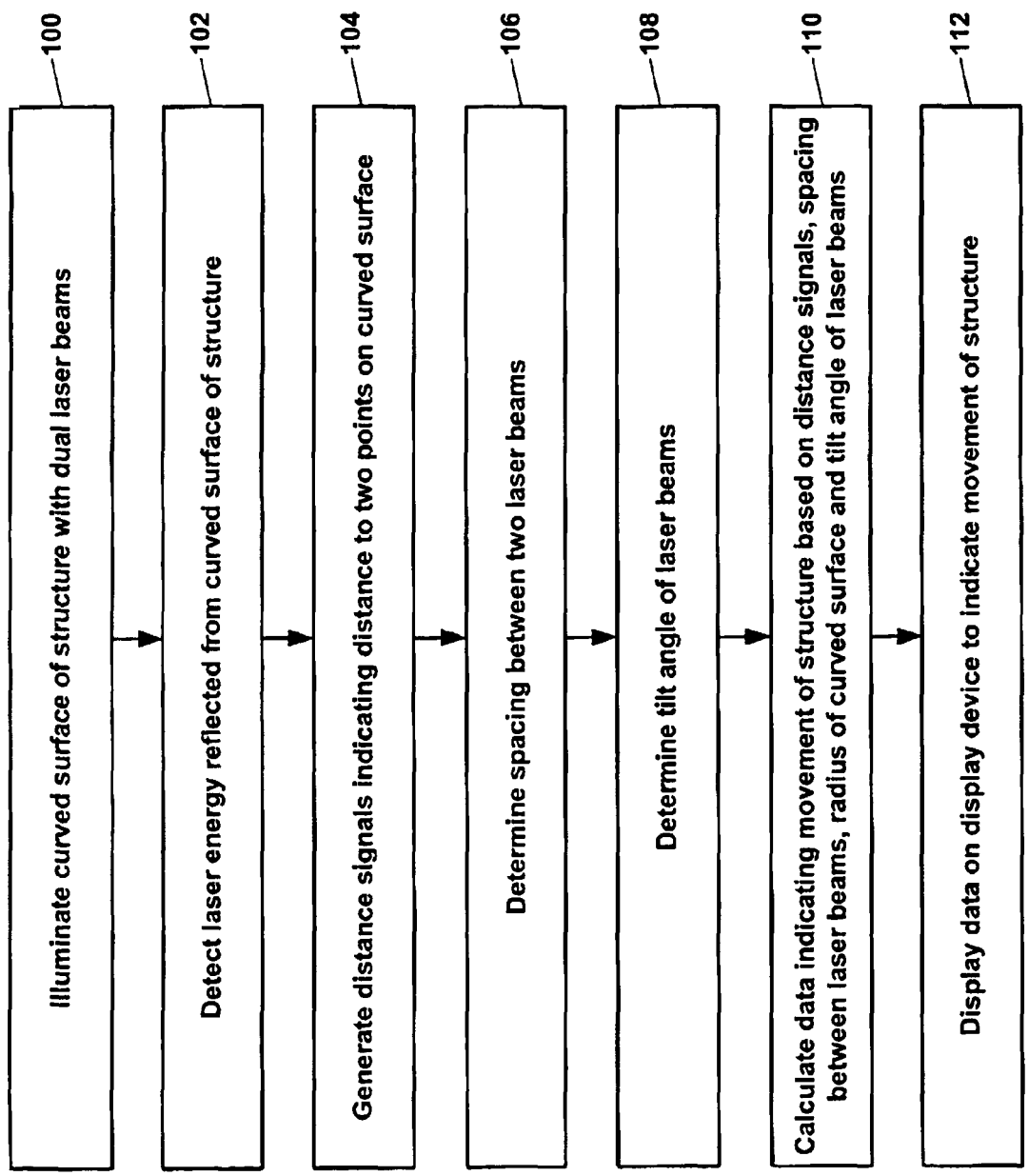
FIG. 3 depicts a flow diagram for a process for remotely measuring displacement of a curved surface.

In a preferred embodiment, the apparatus 10 includes an inclinometer for measuring the angle of tilt β, which is the angle of the laser beams 18a-18b relative to horizontal (step 108 in FIG. 3). The inclinometer 22 may be of the type that provides a visual indication of the angle which may be read by an operator. In a preferred embodiment, the inclinometer 22 outputs an electrical tilt signal that is indicative of the tilt angle β. An example of such an inclinometer is a Positek model P603 tilt sensor.

A sighting scope 38 is preferably attached to the support structure 16. This allows an operator to visually align the apparatus 10 so that the laser beams 18a-18b are properly positioned on the pipe 12 being measured.

In preferred embodiments, the laser distance sensors 14a-14b are slidingly attached to the support structure 16 so that the sensors 14a-14b may be moved closer together or farther apart to set the spacing S to a desired value. In a manually operated embodiment, the positions of the sensors 14a-14b are adjusted by hand and the spacing S is determined based on a linear scale 40 provided on the support structure (step 106 in FIG. 3). In a semiautomatic embodiment, a pair of linear distance sensors 34 (FIG. 2), such as linear variable differential transformers (LVDT's), are attached to the support structure 16 and to the sensors 14a-14b. These sensors 34 output linear displacement signals which provide an indication of the spacing S. In a fully automatic embodiment, a pair of linear actuators 42 (FIG. 2) are attached to the support structure 16 and the sensors 14a-14b. The actuators 42 of this embodiment may be used to automatically set the position of the sensors 14a-14b while generating linear displacement signals which provide an indication of the spacing S.

Figure 2:
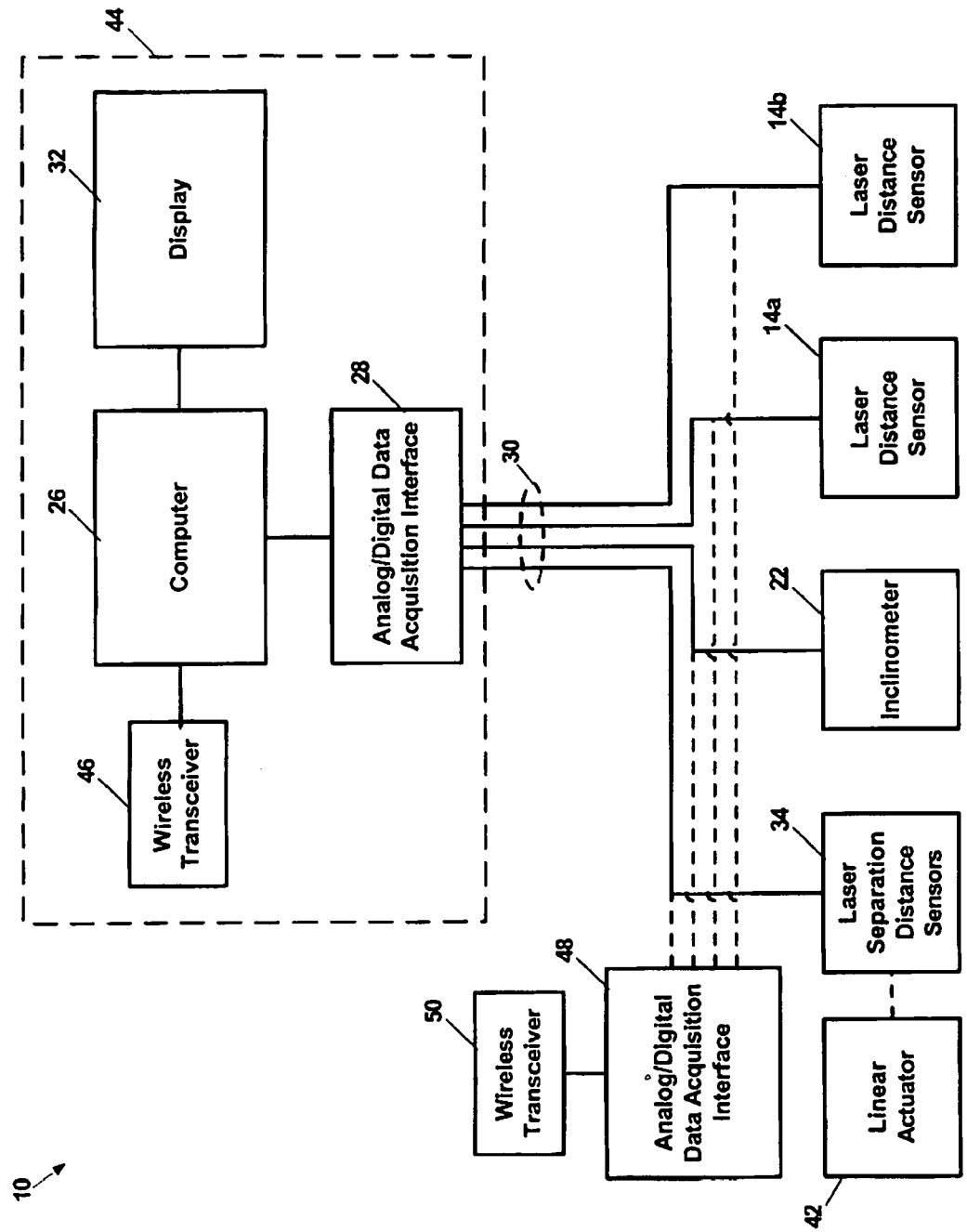
FIG. 2 depicts an electrical block diagram of an apparatus for remotely measuring displacement of a curved surface.

As shown in FIGS. 1 and 2, the laser distance sensors 14a-14b, and any other sensors and actuators attached to the support structure 16, are electrically connected to a data collection system 44 via a wiring harness 30. The data collection system 44 preferably includes a computer processor 26 and display device 32, which may be components of a laptop computer, and a data acquisition card 28. The data acquisition card 28 receives and conditions analog electrical signals from the distance sensors 14a-14b (and any other sensors and actuators attached to the structure 16), converts the analog signals to digital signals, and provides the digital signals to the computer processor 26. The processor 26 then calculates the horizontal and vertical movement of the axial center of the pipe 12 based on the distance signals, the spacing S, the tilt angle β and the radius R of the pipe 12 (step 110 in FIG. 3).

In a preferred embodiment of the invention, the horizontal and vertical movement of the axial center of the pipe 12 is expressed in rectangular coordinates in the coordinate system of the pipe, where the coordinates $(x_{p1}, y_{p1})$ indicate a first position of the axial center measured at a first time and the coordinates $(x_{p2}, y_{p2})$ indicate a second position measured at a second time which is after the first time. In alternative embodiments, the movement of the axial center of the pipe 12 may be expressed in spherical or cylindrical coordinates.

In one embodiment, values for $x_{A2}$ and $y_{A2}$, in the coordinate system of the measurement apparatus 10 $(x_A, y_A)$, are calculated by the computer processor 26, based on the following:

$$x_{A2} = x_{A1} + \left[ \sqrt{R^2 - \left(\frac{\sqrt{(d_2-d_1)^2 + S^2}}{2}\right)^2} \times \frac{d_2 - d_1}{\sqrt{(d_2-d_1)^2 + S^2}} \right] \quad (1)$$

$$y_{A2} = y_{A1} + \left[ \sqrt{R^2 - \left(\frac{S}{2} - x\right)^2} - \sqrt{R^2 - \left(\frac{S}{2}\right)^2} + d_2 - d_{2INIT} \right], \quad (2)$$

where $d_{2INIT}$ is the distance measured by the distance sensor 14b when the axial center of the pipe 12 is at the first position $(x_{A1}, y_{A1})$. Equations (1) and (2) apply in the situation where the tilt angle β of the beams 18a-18b (FIG. 1) relative to horizontal is zero degrees. In this situation, the coordinate system of the pipe 12 $(x_P, y_P)$ coincides with the coordinate system of the measurement apparatus 10 $(x_A, y_A)$. (See FIG. 1.)

In situations where tilt angle β is not zero, a coordinate transformation is performed according to:

$$x_{P1} = x_{A1} \cos\beta - y_{A1} \sin\beta, \quad (3)$$

$$y_{P1} = x_{A1} \sin\beta + y_{A1} \cos\beta, \quad (4)$$

$$x_{P2} = x_{A2} \cos\beta - y_{A2} \sin\beta, \text{ and} \quad (5)$$

$$y_{P2} = x_{A2} \sin\beta + y_{A2} \cos\beta. \quad (6)$$

The result of the calculations performed by the computer processor 26 is a tabulation of pipe position coordinates versus time. In preferred embodiments of the invention, this data is plotted in rectangular coordinates to a generate plot showing the pipe movement over some period of time (step 112 in FIG. 3). These plots may be printed or displayed on the display device 32. This data may also be used to determine modes and frequencies of vibration in the pipe 12.

In an alternative embodiment, the apparatus 10 includes a wireless connection between the sensors mounted on the support structure 16 and the data collection system 44. As shown in FIG. 2, the wireless embodiment includes a data acquisition interface 48 that may be attached to the support structure 16 or the tripod 36 (FIG. 1). The data acquisition interface 48 receives and conditions analog electrical signals from the distance sensors 14a-14b (and any other sensors and actuators attached to the structure 16), converts the analog signals to digital signals, and provides the digital signals to a wireless transceiver 50 which is also attached to the support structure 16 or the tripod 36. The wireless transceiver 50 transmits the digital sensor signals to a wireless transceiver 46 connected to the computer 26 where the signals are processed as described above.

In describing the various embodiments of the invention herein, a pipe is provided as an example of a structure being measured. However, those skilled in the art will appreciate that the apparatus and methods described herein are applicable to the measurement of displacement of various other structures having curved surfaces, such as axles, shafts or rods used in various types of industrial machinery. Thus, the various embodiments of the invention described and claimed herein are not limited to measuring movement of pipes. Also, although exemplary embodiments herein measure movement of a cylindrical surface, the invention is also applicable to surfaces having other curvatures, such as conical or elliptical.

In some applications, two or more of the apparatuses shown in FIG. 1 may be set up to monitor displacement at different points on the same pipe. The measurements from the two systems may then be compared to determine variations in vibration of the pipe along its length.

As shown in FIGS. 4A-4C, the apparatus 10 may be provided in a handheld configuration. FIG. 4A depicts a front view and FIG. 4B depicts a rear view of a first handheld embodiment. In this embodiment, the laser distance sensors 14a-14b are contained within a portable housing 56 having a pistol-like grip 52. A trigger button 54 is provided on the front of the grip 52 for activating the apparatus 10 to begin acquiring data. Preferably, the spacing between the laser distance sensors 14a-14b is adjustable and may be read from the scale 40 provided on the front of the housing 56. A sighting scope 38 is provided for aligning the laser beams with the structure being measured. The handheld device 10 includes a display 32 for displaying measurement results and instructions and prompts for users.

An alternative embodiment of the handheld device 10 is depicted in FIG. 4C. In this embodiment, the laser distance sensors 14a and 14b are pointed upward with respect to the grip 52. This embodiment is particularly useful in measuring movements of overhead pipes and other structures. The sighting scope 38 of this embodiment includes appropriate optical components for bending the optical axis of the scope by 90 degrees to view upward.

In some preferred embodiments of the handheld device 10, the computer processor 26 of FIG. 2 is integrated into the device 10 and is provided within the housing 56. In other embodiments, the handheld device 10 includes a wireless transceiver 50 or wiring harness 30 (FIG. 2) for transferring measurement data to a computer 26 in a remote location.

Those skilled in the art will appreciate that the handheld devices of FIGS. 4A-4C collect and process displacement data in substantially the same manner as the tripod-mounted portable device of FIG. 1 described above.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for measuring displacement of a structure having a curved surface, the apparatus comprising:
   a support structure having opposing first and second ends;
   a first laser distance measurement device disposed adjacent the first end of the support structure, the first laser distance measurement device for generating a first laser beam that illuminates the curved surface of the structure, for detecting laser energy reflected from the curved surface of the structure, and for generating a first distance signal based on the detected laser energy;
   a second laser distance measurement device disposed adjacent the second end of the support structure, the second laser distance measurement device for generating a second laser beam that illuminates the curved surface of the structure, for detecting laser energy reflected from the curved surface of the structure, and for generating a second distance signal based on the detected laser energy; and
   a computer processor for calculating position values indicating displacement of the structure based on the first and second distance signals, a spacing between the first and second laser beams, and a radius of curvature of the curved surface.

2. The apparatus of claim 1 further comprising a measurement device disposed on the support structure for measuring the spacing between the first and second laser beams.

3. The apparatus of claim 1 further comprising an inclinometer disposed on the support structure for measuring an angle of tilt of the first and second laser beams.

4. The apparatus of claim 1 further comprising a stabilizing base to which the support structure is pivotally attached, thereby providing for tilting of the support structure and the first and second laser beams with respect to the structure having the curved surface.

5. The apparatus of claim 1 wherein the curved surface comprises a cylindrical surface, and wherein the computer processor calculates the position values according to:

$$x = \sqrt{R^2 - \left(\frac{\sqrt{(d_2 - d_1)^2 + S^2}}{2}\right)^2} \times \frac{d_2 - d_1}{\sqrt{(d_2 - d_1)^2 + S^2}}$$

$$y = \sqrt{R^2 - \left(\frac{S}{2} - x\right)^2} - \sqrt{R^2 - \left(\frac{S}{2}\right)^2} + d_2 - d_{2INIT},$$

where x is an x-position of the structure having the cylindrical surface, y is a y-position of the structure having the cylindrical surface, S is the spacing between the first and second laser beams, $d_1$ is a distance indicated by the first distance signal, $d_2$ is a distance indicated by the second distance signal, $d_{2INIT}$ is an initial distance indicated by the second distance signal when the cylindrical surface is in an initial position, and R is the radius of curvature of the cylindrical surface.

6. The apparatus of claim 1 wherein the support structure and the first and second laser distance measurement devices are disposed within a portable handheld housing.

7. An apparatus for measuring displacement of a structure having a curved surface, the apparatus comprising:
   a support structure having opposing first and second ends;
   a first laser distance measurement device disposed adjacent the first end of the support structure, the first laser distance measurement device for generating a first laser beam that illuminates the curved surface of the structure, for detecting laser energy reflected from the curved surface of the structure, and for generating a first distance signal based on the detected laser energy;
   a second laser distance measurement device disposed adjacent the second end of the support structure, the second laser distance measurement device for generating a second laser beam that illuminates the curved surface of the structure, for detecting laser energy reflected from the curved surface of the structure, and for generating a second distance signal based on the detected laser energy;
   a measurement device disposed on the support structure for measuring a spacing between the first and second laser beams;
   a stabilizing base to which the support structure is pivotally attached to allow tilting of the support structure and the first and second laser beams with respect to the structure having the curved surface;
   an inclinometer disposed on the support structure for measuring an angle of tilt of the first and second laser beams; and
   a computer processor for calculating position values indicating displacement of the structure based on the first and second distance signals, a spacing between the first and second laser beams, a radius of curvature of the curved surface, and the angle of tilt of the first and second laser beams.

8. The apparatus of claim 7 wherein the support structure, the first and second laser distance measurement devices, the measurement device for measuring the spacing between the first and second laser beams, and the inclinometer are disposed within a portable handheld housing.

9. A method for measuring displacement of a structure having a curved surface, the method comprising:
   (a) generating first and second laser beams that illuminate the curved surface of the structure, the first and second laser beams being substantially parallel to each other;
   (b) detecting laser energy reflected from the curved surface of the structure;
   (c) generating a first distance signal based on the detected laser energy, where the first distance signal is indicative of a first distance to a first portion of the curved surface;
   (d) generating a second distance signal based on the detected laser energy, where the second distance signal is indicative of a second distance to a second portion of the curved surface;
   (e) determining a spacing between the first and second laser beams;
   (f) calculating data values indicating a characteristic of the movement of the structure based on the first and second distance signals, the spacing between the first and second laser beams, and a radius of curvature of the curved surface; and
   (g) displaying the data values on a display device to provide information regarding the movement of the structure.

10. The method of claim 9 further comprising measuring an angle of tilt of the first and second laser beams, wherein step (f) comprises calculating data values indicating a characteristic of the movement of the structure based on the first and second distance signals, the spacing between the first and second laser beams, the radius of curvature of the curved surface, and the angle of tilt of the first and second laser beams.

11. The method of claim 10 wherein the curved surface comprises a cylindrical surface, and the calculating of step (f) is performed according to:

$$x = \sqrt{R^2 - \left(\frac{\sqrt{(d_2 - d_1)^2 + S^2}}{2}\right)^2} \times \frac{d_2 - d_1}{\sqrt{(d_2 - d_1)^2 + S^2}}$$

$$y = \sqrt{R^2 - \left(\frac{S}{2} - x\right)^2} - \sqrt{R^2 - \left(\frac{S}{2}\right)^2} + d_2 - d_{2INIT},$$

where x is an x-position of the structure having the cylindrical surface, y is a y-position of the structure having the cylindrical surface, S is the spacing between the first and second laser beams, $d_1$ is the first distance, $d_2$ is the second distance, $d_{2INIT}$ is an initial value of the second distance when the cylindrical surface is in an initial position, and R is the radius of curvature of the cylindrical surface.

12. The method of claim 9 further comprising the step of performing comparative analysis of the data values over time to correlate the movement of the structure to fatigue and stresses in the structure.

13. An apparatus for measuring displacement of a structure having a curved surface, the apparatus comprising:
   means for generating first and second laser beams that illuminate the curved surface of the structure, the first and second laser beams being substantially parallel to each other;
   means for detecting laser energy reflected from the curved surface of the structure;
   means for generating a first distance signal based on the detected laser energy, where the first distance signal is indicative of a first distance to a first portion of the curved surface:
   means for generating a second distance signal based on the detected laser energy, where the second distance signal is indicative of a second distance to a second portion of the curved surface;
   means for determining a spacing between the first and second laser beams;
   means for calculating data values indicating a characteristic of the movement of the structure based on the first and second distance signals, the spacing between the first and second laser beams, and a radius of curvature of the curved surface; and
   means for displaying the data values to provide information regarding the movement of the structure.

* * * * *